(12) United States Patent
Gokturk et al.

(10) Patent No.: US 9,690,979 B2
(45) Date of Patent: Jun. 27, 2017

(54) TECHNIQUES FOR ENABLING OR ESTABLISHING THE USE OF FACE RECOGNITION ALGORITHMS

(71) Applicant: Google Inc., Mountain View, CA (US)

(72) Inventors: Salih Burak Gokturk, Mountain View, CA (US); Dragomir Anguelov, San Francisco, CA (US); Lorenzo Torresani, San Francisco, CA (US); Vincent O. Vanhoucke, San Francisco, CA (US); Munjal Shah, Los Altos Hills, CA (US); Diem Thanh Vu, Mountain View, CA (US); Kuang-chih Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 490 days.

(21) Appl. No.: 14/153,867

(22) Filed: Jan. 13, 2014

(65) Prior Publication Data

US 2015/0199560 A1    Jul. 16, 2015

Related U.S. Application Data

(60) Continuation of application No. 12/962,494, filed on Dec. 7, 2010, now Pat. No. 8,630,493, which is a division of application No. 11/685,106, filed on Mar. 12, 2007, now Pat. No. 8,571,272.

(60) Provisional application No. 60/781,691, filed on Mar. 12, 2006, provisional application No. 60/781,690, filed on Mar. 12, 2006, provisional application No. 60/781,966, filed on Mar. 12, 2006.

(51) Int. Cl.
  *G06K 9/00* (2006.01)
  *G06K 9/62* (2006.01)
  *G06T 7/73* (2017.01)

(52) U.S. Cl.
  CPC ....... *G06K 9/00281* (2013.01); *G06K 9/6255* (2013.01); *G06T 7/75* (2017.01); *G06T 2200/04* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 5,296,945 A | 3/1994 | Nishikawa et al. |
| 5,450,504 A | 9/1995 | Calia |
| 5,734,749 A | 3/1998 | Yamada et al. |
| 5,781,650 A | 7/1998 | Lobo et al. |
| 5,845,639 A | 12/1998 | Hochman et al. |

(Continued)

FOREIGN PATENT DOCUMENTS

| | | |
|---|---|---|
| JP | 03188586 | 8/1991 |
| JP | 07057043 | 3/1995 |

(Continued)

OTHER PUBLICATIONS

Final Office Action dated Oct. 20, 2008 for U.S. Appl. No. 11/543,758, 7 Pages.

(Continued)

*Primary Examiner* — Weiwen Yang
(74) *Attorney, Agent, or Firm* — Fish & Richardson P.C.

(57) ABSTRACT

Embodiments described herein facilitate or enhance the implementation of image recognition processes which can perform recognition on images to identify objects and/or faces by class or by people.

20 Claims, 6 Drawing Sheets

(56) References Cited

U.S. PATENT DOCUMENTS

| | | | |
|---|---|---|---|
| 5,901,246 A | 5/1999 | Hoffberg et al. |
| 5,982,912 A | 11/1999 | Fukui et al. |
| 6,035,055 A | 3/2000 | Wang et al. |
| 6,173,068 B1 | 1/2001 | Prokoski |
| 6,226,409 B1 | 5/2001 | Cham et al. |
| 6,353,823 B1 | 3/2002 | Kumar |
| 6,381,346 B1 | 4/2002 | Eraslan |
| 6,397,219 B2 | 5/2002 | Mills |
| 6,418,430 B1 | 7/2002 | Defazio et al. |
| 6,427,020 B1 | 7/2002 | Rhoads |
| 6,470,336 B1 | 10/2002 | Matsukawa et al. |
| 6,546,185 B1 | 4/2003 | Kim et al. |
| 6,549,913 B1 | 4/2003 | Murakawa |
| 6,556,196 B1 | 4/2003 | Blanz et al. |
| 6,556,713 B2 | 4/2003 | Kobayashi et al. |
| 6,606,417 B1 | 8/2003 | Brechner |
| 6,785,421 B1 | 8/2004 | Gindele et al. |
| 6,792,135 B1 | 9/2004 | Toyama |
| 6,801,641 B2 | 10/2004 | Eraslan |
| 6,819,783 B2 | 11/2004 | Goldberg et al. |
| 6,919,892 B1 | 7/2005 | Cheiky et al. |
| 6,925,197 B2 | 8/2005 | Dimitrova et al. |
| 6,928,231 B2 | 8/2005 | Tajima |
| 6,937,745 B2 | 8/2005 | Toyama |
| 6,999,614 B1 | 2/2006 | Bakker et al. |
| 7,006,236 B2 | 2/2006 | Tomasi et al. |
| 7,027,620 B2 | 4/2006 | Martinez |
| 7,140,550 B2 | 11/2006 | Ramachandran |
| 7,203,356 B2 | 4/2007 | Gokturk et al. |
| 7,310,431 B2 | 12/2007 | Gokturk et al. |
| 7,340,077 B2 | 3/2008 | Gokturk et al. |
| 7,382,903 B2 | 6/2008 | Ray |
| 7,391,900 B2 | 6/2008 | Kim et al. |
| 7,519,200 B2 | 4/2009 | Gokturk et al. |
| 7,542,610 B2 | 6/2009 | Gokturk et al. |
| 7,583,271 B2 | 9/2009 | Kawakami et al. |
| 7,643,671 B2 | 1/2010 | Dong et al. |
| 7,657,100 B2 | 2/2010 | Gokturk et al. |
| 7,657,126 B2 | 2/2010 | Gokturk et al. |
| 7,660,468 B2 | 2/2010 | Gokturk et al. |
| 7,681,140 B2 | 3/2010 | Ebert |
| 7,689,043 B2 | 3/2010 | Austin et al. |
| 7,698,136 B1 | 4/2010 | Nguyen et al. |
| 7,711,155 B1 | 5/2010 | Sharma et al. |
| 7,853,085 B2 | 12/2010 | Miller |
| 7,996,218 B2 | 8/2011 | Kim et al. |
| 8,385,633 B2 | 2/2013 | Gokturk et al. |
| 8,422,777 B2 * | 4/2013 | Aller .................. G06K 9/3216 382/165 |
| 8,571,272 B2 | 10/2013 | Gokturk et al. |
| 8,630,493 B2 | 1/2014 | Gokturk et al. |
| 2001/0033690 A1 | 10/2001 | Berche et al. |
| 2002/0097893 A1 | 7/2002 | Lee et al. |
| 2002/0103813 A1 | 8/2002 | Frigon |
| 2002/0107718 A1 | 8/2002 | Morrill et al. |
| 2002/0113862 A1 | 8/2002 | Center et al. |
| 2002/0114522 A1 | 8/2002 | Seeber |
| 2002/0156686 A1 | 10/2002 | Kraft et al. |
| 2002/0187774 A1 | 12/2002 | Ritter et al. |
| 2003/0028451 A1 | 2/2003 | Ananian |
| 2003/0063778 A1 | 4/2003 | Rowe et al. |
| 2003/0063779 A1 | 4/2003 | Wrigley |
| 2003/0169906 A1 | 9/2003 | Gokturk et al. |
| 2003/0195901 A1 | 10/2003 | Shin et al. |
| 2003/0202683 A1 | 10/2003 | Ma et al. |
| 2004/0003001 A1 | 1/2004 | Shimura |
| 2004/0102971 A1 | 5/2004 | Lipscher et al. |
| 2004/0215657 A1 | 10/2004 | Drucker et al. |
| 2004/0264780 A1 | 12/2004 | Zhang et al. |
| 2004/0264810 A1 | 12/2004 | Taugher et al. |
| 2005/0002568 A1 | 1/2005 | Chupeau et al. |
| 2005/0033641 A1 | 2/2005 | Jha et al. |
| 2005/0078885 A1 | 4/2005 | Ozaki et al. |
| 2005/0094897 A1 | 5/2005 | Zuniga |
| 2005/0102201 A1 | 5/2005 | Linker et al. |
| 2005/0111737 A1 | 5/2005 | Das et al. |
| 2005/0128197 A1 | 6/2005 | Thrun et al. |
| 2005/0271304 A1 | 12/2005 | Retterath et al. |
| 2006/0023923 A1 | 2/2006 | Geng et al. |
| 2006/0053342 A1 | 3/2006 | Bazakos et al. |
| 2006/0097988 A1 | 5/2006 | Hong |
| 2006/0133699 A1 | 6/2006 | Widrow et al. |
| 2006/0136982 A1 | 6/2006 | Martinolich |
| 2006/0143176 A1 | 6/2006 | Mojsilovic et al. |
| 2006/0173560 A1 | 8/2006 | Widrow et al. |
| 2006/0227992 A1 | 10/2006 | Rathus et al. |
| 2006/0251292 A1 | 11/2006 | Gokturk et al. |
| 2006/0251338 A1 | 11/2006 | Gokturk et al. |
| 2006/0251339 A1 | 11/2006 | Gokturk et al. |
| 2006/0253491 A1 | 11/2006 | Gokturk et al. |
| 2007/0003113 A1 | 1/2007 | Goldberg |
| 2007/0078846 A1 | 4/2007 | Gulli et al. |
| 2007/0081744 A1 | 4/2007 | Gokturk et al. |
| 2007/0098303 A1 | 5/2007 | Gallagher et al. |
| 2007/0258645 A1 | 11/2007 | Gokturk et al. |
| 2008/0080745 A1 | 4/2008 | Gokturk et al. |
| 2008/0082426 A1 | 4/2008 | Gokturk et al. |
| 2008/0091572 A1 | 4/2008 | Kraft et al. |
| 2008/0109841 A1 | 5/2008 | Heather et al. |
| 2008/0144943 A1 | 6/2008 | Gokturk et al. |
| 2008/0152231 A1 | 6/2008 | Gokturk et al. |
| 2008/0154625 A1 | 6/2008 | Serbanescu |
| 2008/0162269 A1 | 7/2008 | Gilbert |
| 2008/0162574 A1 | 7/2008 | Gilbert |
| 2008/0177640 A1 | 7/2008 | Gokturk et al. |
| 2008/0199075 A1 | 8/2008 | Gokturk et al. |
| 2008/0212849 A1 | 9/2008 | Gao |
| 2008/0212899 A1 | 9/2008 | Gokturk et al. |
| 2009/0019008 A1 | 1/2009 | Moore et al. |
| 2009/0034782 A1 | 2/2009 | Gering |
| 2009/0177628 A1 | 7/2009 | Yanagisawa et al. |
| 2009/0196510 A1 | 8/2009 | Gokturk et al. |
| 2009/0208116 A1 | 8/2009 | Gokturk et al. |
| 2009/0248599 A1 | 10/2009 | Hueter et al. |
| 2010/0082604 A1 | 4/2010 | Gutt et al. |
| 2010/0135582 A1 | 6/2010 | Gokturk et al. |
| 2010/0135597 A1 | 6/2010 | Gokturk et al. |
| 2014/0105506 A1 * | 4/2014 | Drost .................. G06K 9/00201 382/199 |

FOREIGN PATENT DOCUMENTS

| | | |
|---|---|---|
| JP | 2002-328925 | 11/2002 |
| JP | 2003-216866 | 7/2003 |
| JP | 2004-220074 | 8/2004 |
| JP | 2006-119836 | 11/2006 |
| KR | 102007007790 | 7/2007 |

OTHER PUBLICATIONS

Final Office Action dated Aug. 11, 2008 for U.S. Appl. No. 11/246,741, 18 Pages.

International Preliminary Report on Patentability and Written Opinion of the International Searching Authority in Application PCT/US2006/018016, Oct. 16, 2008, 12 pages.

International Search Report and Written Opinion of the International Searching Authority in Application PCT/US06/38864, U.S. International Searching Authority, Oct. 14, 2008, 16 pages.

International Search Report and Written Opinion of the International Searching Authority in Application PCT/US07/83935, U.S. International Searching Authority, Aug. 18, 2008, 23 pages.

International Search Report and Written Opinion of the International Searching Authority in Application PCT/US06/18016, U.S. International Searching Authority, Jun. 17, 2008, 17 pages.

Non-Final Office Action dated Oct. 21, 2008 for U.S. Appl. No. 11/936,705, 18 Pages.

Non-Final Office Action dated Oct. 16, 2008 for U.S. Appl. No. 11/777,070, 10 Pages.

Non-Final Office Action dated Jun. 6, 2008 for U.S. Appl. No. 11/543,758, 13 Pages.

Non-Final Office Action dated Dec. 6, 2007 for U.S. Appl. No. 11/246,741, 31 Pages.

(56) References Cited

OTHER PUBLICATIONS

Non-Final Office Action dated Jun. 3, 2008 for U.S. Appl. No. 11/246,742 16 Pages.
Non-Final Office Action dated Oct. 27, 2008 for U.S. Appl. No. 11/936,734, 7 Pages.
Tu, Zhuowen et al., "Image Parsing: Unifying Segmentation, Detection, and Recognition," Proceedings of the Ninth IEEE International Conference on Computer Vision (ICCV 2003), University of California, Los Angeles, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San San Francisco, CA 94115, 9 pages.
Non-Final Office Action dated Feb. 7, 2011 for U.S. Appl. No. 11/685,106, 12 pages.
Notice of Allowance dated Jun. 21, 2013 issued in U.S. Appl. No. 11/685,106, filed Mar. 12, 2007.
Non-Final Office Action dated Feb. 14, 2013 issued in U.S. Appl. No. 11/685,106, filed Mar. 12, 2007.
Action Closing Prosecution mailed Apr. 26, 2010 for U.S. Appl. No. 95/001,307; 20 pages.
Arnold W.M. Smeulders, et al., "Content-Based Image Retrieval at the End of the Early Years", IEEE Transactions on Pattern Analysis and Machine Intelligence, vol. 22, No. 12. Dec. 2000, 32 pages.
Charels Frankel, et al., "WebSeer: An Image Search Engine for the World Wide Web", The University of Chicago, Computer Science Department, 110 East 58th Street, Chicago, Illinois 60637, Technical Report 96-14, Aug. 1, 1996, 24 pages.
Final Office Action dated Sep. 6, 2011 for U.S. Appl. No. 12/395,422, 11 pages.
Final Office Action dated Jun. 30, 2009 for U.S. Appl. No. 11/246,589, 13 Pages.
Final Office Action dated Jul. 7, 2009 for U.S. Appl. No. 11/777,070, 10 Pages.
Final Office Action dated Jun. 16, 2009 for U.S. Appl. No. 11/936,705, 20 Pages.
Final Office Action mailed May 12, 2010 for U.S. Appl. 12/431,706; 12 pages.
Final Office Action dated Oct. 27, 2009 for U.S. Appl. No. 11/246,741, 20 Pages.
Final Office Action dated Jun. 2, 2010 for U.S. Appl. No. 12/395,422, 21 pages.
Gangopadhyay, Aryya, "An image-based system for electronic retailing", Decision Support Systems 32, 2001, Department of Information Systems, University of Mayland Baltimore County, 1000 Hilltop Circle, ACIV 481, Baltimore, MD 21250, 10 pages.
International Preliminary Report on Patentability in Application PCT/US2006/038864, Nov. 27, 2008, 10 pages.
International Preliminary Report on Patentability in Application PCT/US2006/038864, Dec. 11, 2008, 10 pages.
International Preliminary Report on Patentability and Written Opinion of the International Searching Authority in Application PCT/US2007/083935, May 22, 2009, 20 pages.
International Search Report and Written Opinion mailed Feb. 24, 2010 in PCT/US2009/050600, 13 pages.
International Search Report, Written Opinion and Notice of Transmittal of same mailed Aug. 17, 2010 in PCT/US10/037139, 10 pages.
Lii, Yi et al., "Object Recognition for Content-Based Image Retrieval", Department of Computer Science and Engineering, University of Washington, Seattle, WA 98195-2350, Jan. 2002, 21 pages.
Liu, James et al., "Smart Shopper: An Agent-Based Web-Mining Approach to Internet Shopping," IEEE Transactions on Fuzzy Systems, vol. 11, No. 2, Apr. 2003, 12 pages.
Non-Final Office Action dated Sep. 14, 2009 for U.S. Appl. No. 11/246,434, 11 pages.
Non-Final Office Action dated Sep. 30, 2009 for U.S. Appl. No. 12/431,706. 9 pages.
Non-Final Office Action dated May 28, 2009 for U.S. Appl. No. 11/246,434, 6 Pages.
Non-Final Office Action dated Aug. 6, 2009 for U.S. Appl. No. 11/936,734, 6 Pages.
Non-Final Office Action dated Apr. 7, 2009 for U.S. Appl. No. 11/246,741, 21 Pages.
Non-Final Office Action dated Dec. 2, 2009 for U.S. Appl. No. 11/246,589. 14 pages.
Non-Final Office Action dated Dec. 29, 2008 for U.S. Appl. No. 11/246,589, 19 pages.
Non-Final Office Action dated Oct. 27, 2008 for U.S. Appl. No. 11/246,434, 11 Pages.
Non-Final Office Action dated Oct. 7, 2010 for U.S. Appl. No. 11/841,355, 15 pages.
Non-Final Office Action dated Dec. 30, 2008 for U.S. Appl. No. 11/936,713, 15 Pages.
Non-Final Office Action dated Oct. 12, 2011 for U.S. Appl. No. 12/819,901, 17 pages.
Non-Final Office Action dated Oct. 12, 2011 for U.S. Appl. No. 12/648,245, 17 pages.
Non-Final Office Action dated Aug. 17, 2011 for U.S. Appl. No. 11/936,694, 8 pages.
Non-Final Office Action dated Mar. 25, 2011 for U.S. Appl. No. 11/777,894, 24 pages.
Non-Final Office Action dated Feb. 7, 2011 for U.S. Appl. No. 12/395,422, 10 pages.
Non-Final Office Action dated Dec. 15, 2009 for U.S. Appl. No. 12/395,422. 10 pages.
Notice of Allowance dated Jun. 2, 2010 for U.S. Appl. 11/777,070 16 pages.
Notice of Allowance dated Jan. 5, 2011 for U.S. Appl. No. 12/431,706; 9 pages.
Notice of Allowance dated Oct. 29, 2010 for U.S. Appl. No. 12/431,706; 9 pages.
Notice of Allowance dated Aug. 11, 2010 for U.S. Appl. No. 11/246,589, 10 pages.
Notice of Allowance dated Feb. 22, 2010 for U.S. Appl. No. 11/246,343. 6 pages.
Notice of Allowance dated Jun. 9, 2010 for U.S. Appl. No. 11/246,434 11 pages.
Notice of Allowance dated Dec. 22, 2008 for U.S. Appl. No. 11/246,742, 12 Pages.
Notice of Allowance dated Apr. 17, 2009 for U.S. Appl. No. 11/543,758, 14 Pages.
Notice of Allowance dated Oct. 1, 2009 for U.S. Appl. No. 11/936,734, 12 Pages.
Notice of Allowance dated Sep. 28, 2009 for U.S. Appl. No. 11/936,713, 15 Pages.
Notice of Allowance dated Mar. 1, 2010 for U.S. Appl. No. 11/777,070 11 pages.
Notice of Allowance dated Sep. 17, 2009 for U.S. Appl. No. 11/936,705 14 pages.
Notice of Allowance dated Aug. 17, 2010 for U.S. Appl. No. 11/246,741, 23 pages.
Order Granting/Denying Request for Inter Parts Reexamination mailed Apr. 26, 2010 for U.S. Appl. No. 95/001,30; 15 pages.
Philippe Aigrain, et al., "Content-Based Representation and Retrieval of Visual Media: A State-of-the-Art-Review", Multimedia Tools and Applications 3, 179-202, 1996, 24 pages.
Replacement Request for Ex Parte Reexamination dated Mar. 18, 2010 for U.S. Appl. No. 95/001,307, 145 pages.
Roweis et al., "Nonlinear Dimensionality Reduction by Locally Linear Embedding", Science, vol. 290, Dec. 22, 2000, pp. 2323-2326.
Supplemental International Search Report for EP Application No. 07868686.2, 8 pages.
Wang, James et al., "SIMPLIcity: Semantics-Sensitive Integrated Matching for Picture Libraries" IEEE Transactions on Pattern Analysis and Machine Intelligence, vol. 23, No. 9, Sep. 2001, 17 pages.
Weinberger et al., "Distance Metric Learning for Large Margin Nearest Neighbor Classification", Advances in Neural Information Processing Systems, vol. 18, 2006, pp. 1473-1480.

(56) References Cited

OTHER PUBLICATIONS

Weinberger et al., "Nonlinear Dimensionality Reduction by Semidefinite Programming and Kernel Matrix Factorization", Proceedings of the 10th International Workshop on Artificial Intelligence and Statistics, 2005, pp. 381-388.
Non-Final Office Action dated Oct. 21, 2011 for U.S. Appl. No. 12/962,494, 11 pages.
Notice of Allowance dated Nov. 10, 2011 for U.S. Appl. No. 12/819,970, 22 pages.
Non-Final Office Action dated Nov. 23, 2011 for U.S. Appl. No. 13/088,277, 10 pages.
Non-Final Office Action dated Nov. 22, 2011 for U.S. Appl. No. 12/961,790, 34 pages.
Final Office Action dated Dec. 6, 2011 for U.S. Appl. No. 11/777,894, 29 pages.
Non-Final Office Action dated Jan. 4, 2012 for U.S. Appl. No. 12/648,287, 17 pages.
Supplemental European Search Report dated Dec. 16, 2011 for EP Application No. 09798677.2, 8 pages.
Non-Final Office Action mailed Jan. 17, 2012, for U.S. Appl. No. 12/182,122, filed Jul. 29, 2008.
Final Office Action dated Feb. 23, 2012, issued in U.S. Appl. No. 12/503,034, filed Jul. 14, 2009.
Yamaguchi et al., ""Smartface"—A Robust Face Recognition System under Varying Facial Pose and Expression," IEICE Trans. Inf. & Syst. E86-D.1 (2003): pp. 37-44.
Final Office Action dated Jun. 13, 2012, issued in U.S. Appl. No. 12/962,494, filed Dec. 7, 2010, Gokturk et al.
Final Office Action dated Jun. 25, 2012, issued in U.S. Appl. No. 12/961,790, filed Dec. 7, 2010, Gokturk et al.
Notice of Allowance dated Oct. 24, 2012 issued in U.S. Appl. No. 12/961,790, filed Dec. 7, 2010.
Zabrodsky, et al. "Completion of Occluded Shapes using Symmetry." Proc. CVPR. (1993): 1-4. Print.
Johnson, et al. "The recognition of partially visible natural objects in the presence and absence of their occluders." Vision Research. 45. (2005): 3262-3276. Print.
Tieu, et al. "Boosting Image Retrieval." International Journal of Computer Vision—Special Issue on Content-Based Image Retrieval. 56.1-2 (2004): 17-36. Print.
"Object Recognition using Pictorial Structure Models.". University of Wisconsin Computer Sciences Department, Dec. 17, 2003. Web. Sep. 7, 2013. <http://pages.cs.wisc.edu/~twalker/CS766HW4/>.
Schneiderman, et al. "Probabilistic Modeling of Local Appearance and Spatial Relationships for Object Recognition." Proc. CVPR. (1998): n. page. Print.

\* cited by examiner

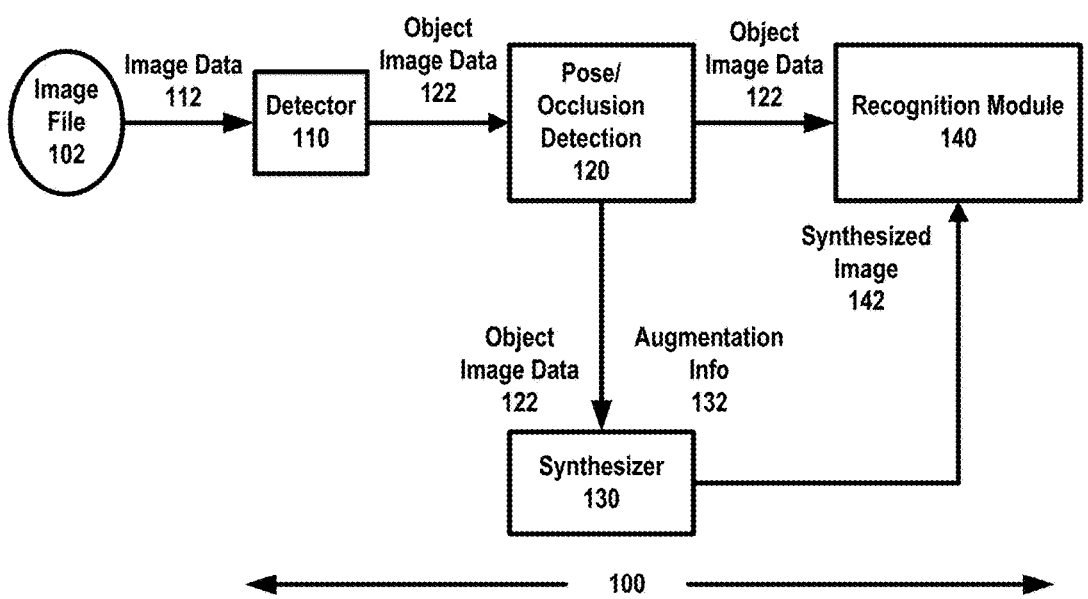
FIG. 1A
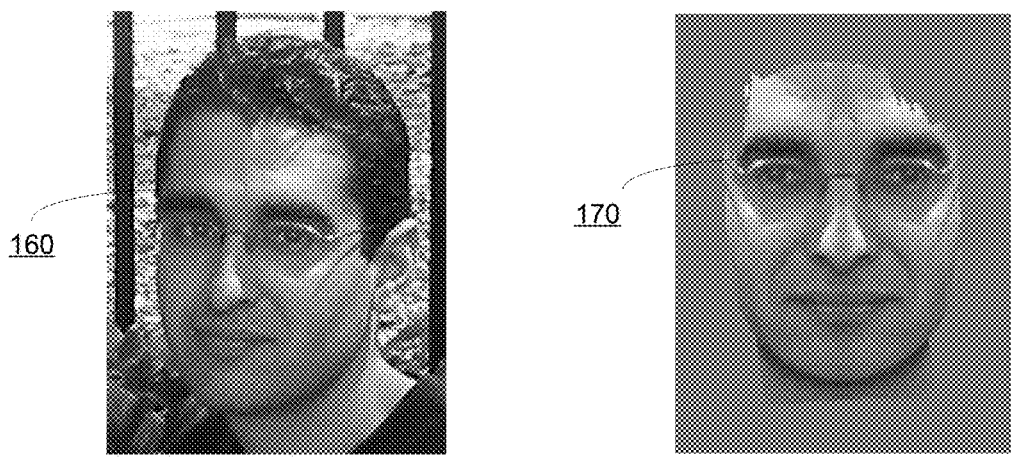
FIG. 1B   FIG. 1C

TECHNIQUES FOR ENABLING OR ESTABLISHING THE USE OF FACE RECOGNITION ALGORITHMS

RELATED APPLICATIONS

This application is a continuation of U.S. patent application Ser. No. 12/962,494, filed Dec. 7, 2010, now U.S. Pat. No. 8,630,493, which is a divisional of U.S. patent application Ser. No. 11/685,106, filed Mar. 12, 2007, now U.S. Pat. No. 8,571,272, which claims benefit of priority to U.S. Provisional Patent Application Nos. 60/781,691, 60/781,690 and 60/781,966, all filed Mar. 12, 2006. All of the aforementioned priority applications are hereby incorporated by reference in their entirety.

TECHNICAL FIELD

The disclosed embodiments relate generally to the field of digital image processing. More particularly, the disclosed embodiments relate to a system and method for enabling the use of captured images.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-ROMs, and flash memory. The use of file folders is the primary source of organization, although applications have been created to aid users in organizing and viewing digital images. Some search engines, such as GOOGLE, also enables users to search for images, primarily by matching text-based search input to text metadata or content associated with images.

BRIEF DESCRIPTION OF THE DRAWINGS

FIG. 1A illustrates a system for generating synthesized images to accommodate or compensate for pose and/or occlusion, according an embodiment of the invention.

FIG. 1B and FIG. 1C illustrate how a digital photograph may be synthesized, according to one or more embodiments of the invention.

DETAILED DESCRIPTION

Figure 2:
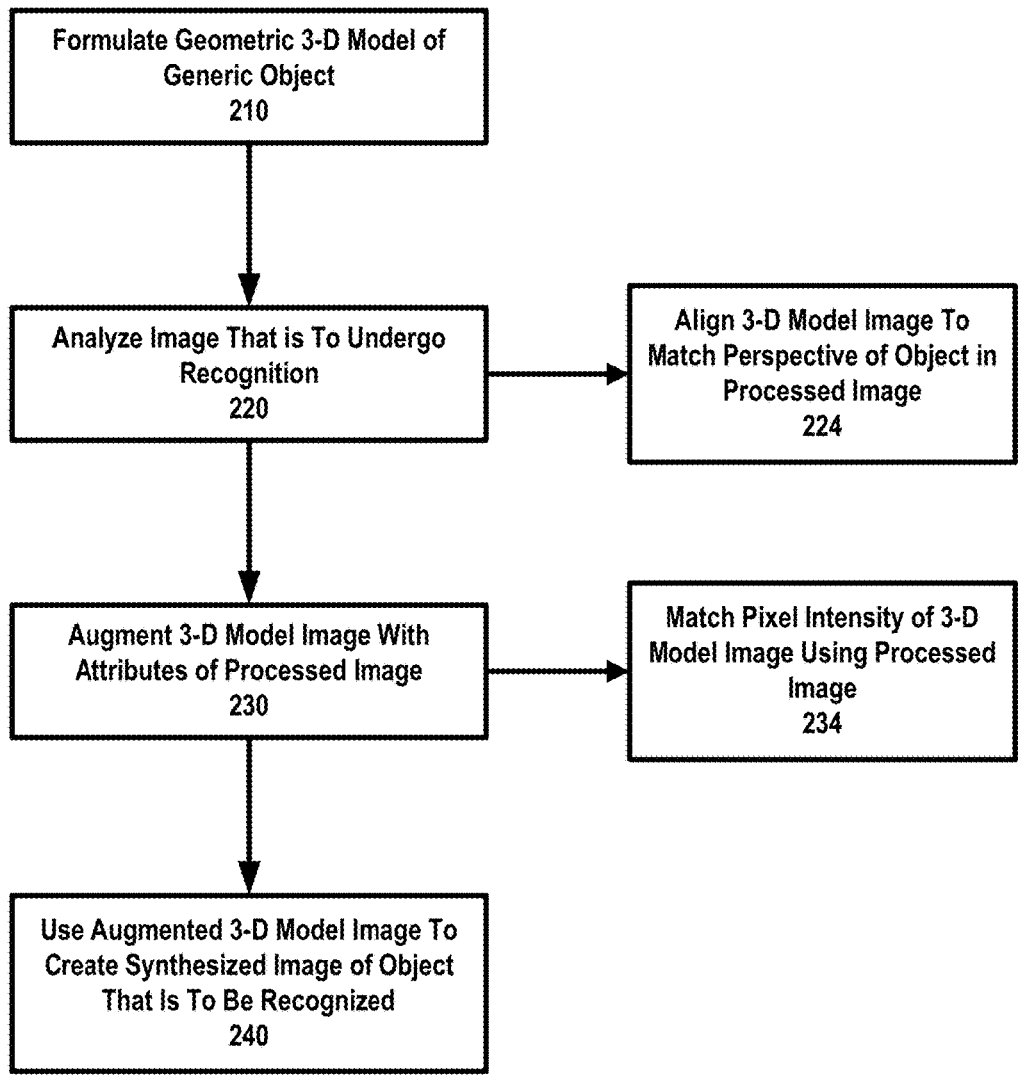
FIG. 2 illustrates a method for generating synthesized images to accommodate or compensate for pose and/or occlusion, according an embodiment of the invention.

Embodiments described herein facilitate or enhance the implementation of image recognition processes which can perform recognition on images to identify objects and/or faces by class or by people.

When employed on a collection of digital images, embodiments described herein enable the use of several preliminary steps to enhance the performance of recognition and the results derived therein. These preliminary steps may include (i) establishing a labeled training set of images from which subsequent recognition can take place; (ii) registering faces or objects, to facilitate the ability of a recognition algorithm to be able to determine corresponding points on different objects or faces; and (iii) enabling the recognition algorithms to compensate or otherwise overcome occlusion or posing of the object that would otherwise diminish or preclude the algorithm from detecting features or corresponding points of the object of interest.

Embodiments described herein provide for computer-implemented image recognition of objects in images. According to an embodiment, an object is identified from an image, where the object that is posed so as to occlude one or more regions of the object in the image. Image data is synthesized for at least some of the one or more occluded regions of the object. Recognition is performed on the object using the synthesized image data.

According to another embodiment, recognition is facilitated or enabled through the creation of a training set, using a programmatic and adaptive technique for identifying or selecting images for use in a training set. In one embodiment, a set of candidate images are programmatically selected, from a collection of images, for a training set. The set of images are then presented to the user. Individual images from the candidate set are presented to the user for feedback or input, and select images presented to the user may be identified as part of the training set.

According to an embodiment such as described, the training set may continuously be modified or updated. As an addition or alternative, a threshold criteria for selecting images in the training set may be made adaptive based on factors that include the error rate or other measure of how well recognition is performed with the given training set.

Examples of objects that may be used with one or more embodiments include a face, a person, apparel, clothing, merchandise, and animals.

According to another embodiment, image recognition includes determining a region of an image where an object that is to be recognized is likely located. The object of interest may be known to have specific set of features, which may be defined in variety of ways (e.g. geometric constraints) through two or three dimensional models. For each of a plurality of features of the object of interest, a set of hypotheses regions of the image may be determined. These hypotheses regions may correspond to likely locations of that feature in the object that is to be recognized. A most likely location of at least some of the plurality of features using may then be determined using the set of one or more hypothesis regions for all of the plurality of features.

Various applications and implementations are contemplated for one or more embodiments of the invention.

As used herein, the term "image data" is intended to mean data that corresponds to or is based on discrete portions of a captured image. For example, with digital images, such as those provided in a JPEG format, the image data may correspond to data or information about pixels that form the image, or data or information determined from pixels of the image.

The terms "recognize", or "recognition", or variants thereof, in the context of an image or image data (e.g. "recognize an image") is meant to means that a determination is made as to what the image correlates to, represents, identifies, means, and/or a context provided by the image. Recognition does not mean a determination of identity by name, unless stated so expressly, as name identification may require an additional step of correlation.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Recognition of Occluded Portions of an Object in an Image

In the field of digital photography, objects in images are often posed at an angle or tilt with respect to the viewpoint of the camera lens. The ability of image recognition systems or software to work properly on such objects may be negatively affected. For example, an object at a tilt or angle may have portions of the object occluded or otherwise not visible in the image. Embodiments described herein accommodate or otherwise compensate for occurrences of tilts in the pose of objects, including in instances when occlusion is present in the object of interest, when recognition is performed on posed objects of images.

Facial recognition is an example of one type of recognition performed with digitally captured images. In general, facial recognition identifies the location of a face of a person in an image, then seeks to use a signature of the person's face to identify that person by name or by association with other images that contain that person. Non-facial recognition may be similarly performed, in that a pre-determined object may be detected from a digital image, then a signature of the object may be used to identify the object by class or otherwise.

One or more embodiments recognize that for image recognition to be performed accurately on, for example, consumer images or randomly posed objects in images, either (i) the face/object being recognized can be assumed to be frontally aligned, or (ii) occlusion or pose distortions of the object of interest must be accommodated or compensated for programmatically or otherwise. For example, in the absence of occlusion compensation, facial or object image recognition may require utilization of simplifying assumptions about the face or object being recognized. Such assumptions may assume, for example, the face or object is in a frontal position (relative to the camera) when the image is captured.

In practice, large variations in viewpoints are extremely common in consumer photographs. With regard to facial recognition, in particular, head rotations can produce significant changes and distortions in the facial appearance of an individual in a photograph. Such effects generally cause significant degradation of face recognition performance.

Embodiments described herein enable generation of a realistic image of a face or other object, using as input, an original image that has one or more portions of the face or object occluded or rotated. In particular, one or more embodiments provide that a synthesized image may be generated of a face or object. The synthesized image may present the face or object in a frontal view and at a specified position or viewpoint. The input for creating the synthesized image may correspond to an image that contains the face or object posed at some arbitrary viewpoint that causes occlusion.

In one embodiment, a synthesized frontal view of a face can replace the original photograph as input in a face recognition system in order to produce more accurate recognition performance. Alternatively, a synthesized frontal view of an object can replace the original photograph as input in an object recognition system. For example, the object may correspond to clothes, apparel, merchandise, a person (rather than just a face) or even an animal or animal face.

In another embodiment, a combination of the two-dimensional original view and a synthesized frontal view can be used at the same time. For this task, while matching two faces, either a weighted average of the two, or the minimum distance of the two metrics can be used.

One or more embodiments described herein recognize that a frontal view of an object may be synthesized from a non-frontally viewed image of that same object using comparison or prior knowledge of a generic appearance of the object or of a class or kind of the object. In one embodiment, a frontal view of a face may be synthesized from a non-frontally viewed image of that face using prior knowledge of a generic appearance of a face (or a type of face) or an object. According to one embodiment, a geometric three-dimensional model of an object (including face) that is to be recognized is used to provide prior knowledge or reference for synthesis.

FIG. 1A illustrates a system for generating synthesized images to accommodate or compensate for pose and/or occlusion, according an embodiment of the invention. In FIG. 1A, a system 100 may comprise a plurality of modules include an object detector 110, a pose or occlusion detection module 120, and a synthesizer 130.

System 100 may receive image data 112 from an image source 102. Examples of the image source 102 include a digitally captured image, such as images captured by digital cameras or images presented with other content. The resolution of the image source 102 may vary, depending on, for example, an application of an embodiment of FIG. 1A, as well as other parameters.

The object detector 110 may scan image data 112, corresponding to the image file 102, to detect an object of interest. In one embodiment, the object of interest corresponds to a face of a person. Detection of the face may be performed by scanning the image data 112 for features that are indicative of a face, such as the eyes, eyebrows, or corners of a mouth. Other examples of objects of interest include clothes, apparel, merchandise, a person (rather than just a face), an animal or animal face. For each type of object that is of interest for recognition, markers of that object's class may be pre-defined, and images may be scanned for such markers in order to detect presence of those objects in an image.

Object image data 122 may be used by the pose/occlusion module 120 to determine whether the detected image is posed to a degree that would cause occlusion or other significant deterioration of recognition. Alternatively, the pose/occlusion module 120 may detect, from the object image data 122, whether the image is posed to a degree that would hinder or interfere image recognition analysis on the object.

The pose/occlusion module 120 may determine that the pose of the object of interest within an acceptable threshold, in which case no synthesis is performed. If, however, the pose/occlusion module 120 determines that the pose of the object of interest is significant, or if there is occlusion from the pose of the object of interest, the pose/occlusion module 120 executes to determine augmentation information 132. In one embodiment, augmentation information 132 may utilize a three-dimensional model of a generic or non-specific object (of the same class as the object of interest) to quantify the pose (e.g. orientation) and position of the object of interest, as well as the intensity of discrete points of the object of interest.

The synthesizer 130 may utilize the object image data 122, as well as the augmentation information 132 as determined from the pose/occlusion module 120, to generate a synthesized image 142 of the image file 102. The synthesized image 142 may use the augmentation information 132 to re-orient and possibly re-position the object of interest. For example, if the object of interest is a face that is tilted one way or another, the synthesized image 142 may re-align the face so as to orient it towards a hypothetical camera angle.

In an embodiment, synthesized image 142 is simply an output of system 100. For example, images in a photo-library may be scanned, and faces of persons appearing at an angle may be synthesized and presented as an independent set of images, each with the images of the person provided frontally. In another embodiment, synthesized image 142 is generated for purpose of performing a process such as image recognition. In cases when the object of interest, as determined from the image file 102 is too angled and/or occluded to perform recognition, synthesized image 142 may be generated as replacement input. Image recognition module 140 may perform recognition on the object of interest using the synthesized image 142 as input.

FIG. 1B and FIG. 1C illustrate how a digital photograph may be synthesized, according to one or more embodiments of the invention. FIG. 1B illustrates a side view of a face 160, as well as a synthesized frontal view 170 generated by a system such as described with an embodiment of FIG. 1. In an embodiment, a synthesis of frontal view faces from non-frontal faces in photographs can be used as a preprocessing step in view-dependent face recognition systems. Thus, embodiments described herein enable improved recognition performance by allowing face recognition systems to compare faces perfectly aligned and in standard pose, where appearance variations due to changes in viewpoints are eliminated.

One or more embodiments described herein recognize that a frontal view of an object may be synthesized from a non-frontally viewed image of that same object using comparison or prior knowledge of a generic appearance of the object or of a class or kind of the object. FIG. 2 illustrates a method for generating synthesized images to accommodate or compensate for pose and/or occlusion, according an embodiment of the invention. A frontal view of a face may be synthesized from a non-frontally viewed image of that face using prior knowledge of a generic appearance of a face (or a type of face). A method such as described by an embodiment of FIG. 2 may be performed using a system such as described with an embodiment of FIG. 1A, and further implemented using a computer such as described with FIG. 8.

Step 210 provides that a geometric three-dimensional model of an object that is to be recognized is formulated. The model may be generic to a class of the object. For example, in face recognition, the model may be for a non-specific or generic face, having characteristics or features generally known to be part of faces. The model may correspond to, or form the basis of, a reference or prior knowledge for when image synthesis is to occur.

In one implementation, a suitable model can be a triangular mesh of three-dimensional points, specified by a set of vertices and edges. Alternatively, the three-dimensional model may be in the form of a discrete cloud of three-dimensional points, from which a continuous three-dimensional surface may be computed by standard methods of interpolation and extrapolation. In yet another implementation, the model may be in the form of a deformable graph of connected three-dimensional points that can be perturbed in three-dimensional space in some specified way in order to account for geometric facial variations among individuals or to represent facial expressions, such as smiling or frowning.

In step 220, the image that is to undergo recognition is analyzed to determine pose and position of the object of interest. Given a non-frontal face photograph, one embodiment provides a computer-implemented algorithm that analyzes the image in order to recover information indicating a rotation or position of the object in the image relative to the camera. For example, with regard to facial recognition, such an algorithm may first seek to recover the rotation and position of the face three-dimensionally, from the perspective of the camera lens. This can be formulated as the task of "virtually' orienting and positioning the three-dimensional model in space in such a way that the simulated projection of rays from the model to the camera best match the face in the photograph. For example, the ray departing from the tip of the nose of the three-dimensional model may intersect the camera image plane at the tip of nose of the face in the photograph. The relationship between the points of the three-dimensional model in space and the image points of the face in the photograph can be described by a mathematical camera model, such as orthographic or full perspective projection.

According to one embodiment, sub-step 224 (of step 220) provides that attributes of position and orientation may be determined from use of projective three-dimensional models. In one embodiment, an unknown orientation and position of the object (such as a face) in three-dimensional space can be specified in terms of a rotation matrix, and a translation vector. These unknown parameters can be computed by establishing a set of correspondences between the three-dimensional model points and the image points. For example, an image registration algorithm (such as described with one or more embodiments of FIG. 6) can identify specific object or facial key-points in the image source 102. In the case where the object is a face, the points may correspond to the corners of the eyes and mouth, and the tip of the nose. Since the positions of these key-points on the three-dimensional model are established in advance, the unknown rotation matrix and translation vector can be computed by solving the system of equations resulting from the camera projection model. For example, closed-form, linear least-square minimization methods or iterative, gradient descent techniques can be applied for such task. In another embodiment, the pose estimation problem can be formulated as a classical vision tracking problem, where optical flow computation between the original image and the synthesized image is calculated in order to solve for pose and appearance at the same time.

Step 230 provides that the three-dimensional model (established in step 210) is augmented using one or more attributes from the image. In one embodiment, the attribute used to augment the three-dimensional model is intensity. As illustrated by sub-step 234, once the three-dimensional orientation and position of the face has been recovered, an intensity value is associated to each point of the three-dimensional model. The intensity value for each three-dimensional point is set to be the image value at the projection of the three-dimensional point onto the photograph, according to the recovered three-dimensional alignment and camera model. This process augments the three-dimensional model with the description of the appearance of each model point in that photograph.

Some of the three-dimensional points of the model might not be visible in the photograph due to occlusion caused by other parts of the face. The system can detect which points are not visible by using methods of surface-ray intersection computation. In one embodiment, the intensities of occluded three-dimensional points can be filled-in by exploiting face symmetry: for example, the system might set the image intensities of the left side of the nose to be identical to those of the right side, if the left side is detected to be occluded.

As an alternative to face symmetry, one or more embodiments provide that intensities of occluded regions can be marked, such as with text or a flag. For example, such portions may optionally be marked as "not available".

In step 240, the three-dimensional model augmented with intensity values is used to synthesize the frontal view of the face. The three-dimensional model is first aligned to be in exact frontal position and then standard rendering methods, such as ray casting, are used to generate the new photograph.

According to an embodiment, if there are any occluded regions that are marked as "not available", the corresponding pixels are left unfilled in the final photograph.

Programmatic and Intelligent Selection of Images for Training Sets and Labeling

In order to perform recognition of a desired object, image recognition techniques sometimes require a training set. The training set provides identified faces (or other objects) that, as a point of comparison, provide identity information when recognition is performed on a set of images undergoing recognition. If an object in an image undergoing recognition is deemed, through recognition, to be the same object (or alternatively the same class of object) as one of the objects in the training set, then the identity of the object under recognition is determined to be the same as that identity of the corresponding object of the training set. In the case of facial recognition, for example, the training set may include images of faces of different persons. A set of images undergoing recognition may be compared against the training set, and if matches are found between the two sets, then the identity of a recognized face from the second set is assigned the identity of the matching face from the training set. In order to provide identity information, objects contained in images of the training set may contain one or more signatures or other data identification, as well as a label or tag provided by a user. For facial recognition, the label or tag may correspond to a name.

Embodiments described herein enable a user to scan a set of digital images in order to assign labels (e.g. corresponding identity information) to object or faces in the images. However, embodiments described herein also recognize that the user may not be the best source for identifying the training set from a library of images. In many cases, users typically are unaware of what images in their data set or suited for training set. For example, the user may identify images having faces or objects that are difficult to recognize because, for example, the object is severely tilted in its pose or positioned poorly for recognition in the image.

One or more embodiments provide for an algorithm that can be executed through use of a computer in order to programmatically select examples of images that can provide an adequate reference for inclusion in a training set. In one embodiment, an image for the training set may be programmatically selected by selecting the image of an object or face that produces, from within a library of collection of images, the maximum recognized number of objects when used as part of training set by a face recognition algorithm. The programmatically selected images (or the portions containing the object that is to be recognized) may be displayed or otherwise rendered to the user. The user is then able to label the pictures, and the labeled pictures may be used as a training set by the image recognition program. An approach as described with such an embodiment provides several benefits. The user is required to know information for how to select images for a training set. An embodiment such as described may also optimize images that are returned and used for a training set, thus providing some limit to the amount of labeling that may otherwise be required of the user. Moreover, the quality of the training set is high.

Figure 3:
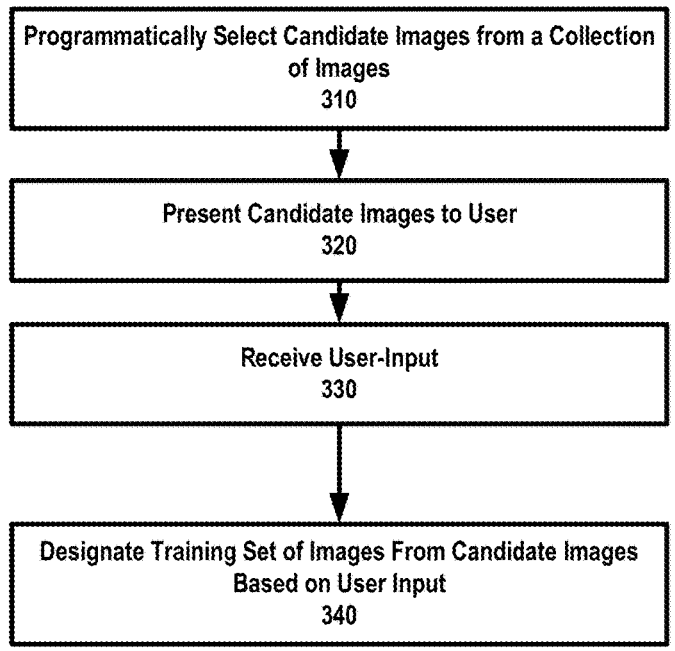
FIG. 3 illustrates a method for determining a set of training images for performing image recognition on one or more objects of interest, under an embodiment of the invention.

FIG. 3 illustrates a method for determining a set of training images for use in performing image recognition for one or more objects of interest, according to an embodiment of the invention. A method such as described in FIG. 3 may be used to establish a training set (or set of reference images) for use on a collection of images, and/or for newly received or captured images.

In a step 310, a set of candidate images are selected from a collection. Numerous techniques may be employed in order to determine an initial set of candidate images for a training set. The algorithm for choosing the training examples can be designed in many ways. In one embodiment, any clustering algorithm can be used, such as k-means clustering. The clustering algorithm would segment the group of faces into groups (clusters) based on a vector description (feature vector) for each face. Once the clusters are obtained, different metrics are obtained for each cluster. These different metrics include, for example, cluster size and/or cluster compactness. Cluster size determines how many objects or faces are included in that particular cluster. Cluster compactness determines how spread the faces in that cluster are. The more spread is the cluster, the more likely that there would be errors (multiple identities) within that cluster. Metrics such as cluster size and compactness may be used to choose cluster centers to be presented to the user. The first metric optimizes the number of recognized faces, whereas the second metric optimizes the accuracy of the recognition. A combination of these metrics can also be used.

In step 320, the candidate images are presented to the user for labeling or other input. For example, for a given collection, a set of images may be displayed to the user, where different faces or objects of interest are identified from the images in the set. According to one implementation, presenting the set of candidate images to the user is performed with chosen cluster centers (corresponding to the face or object closest to the cluster center).

In step 330, user-input is received. The user-input corresponds to, for example, labeling. In facial recognition, for example, labeling may correspond to the user providing a name, nickname or other individual or class identifier to a picture of a face or person.

In step 340, the training set is established using the candidate images and the input or labels provided from the user. The training set is then subsequently used to recognize select or desired objects from images that undergo recognition.

With regard to an embodiment of FIG. 3, it is also possible for a user to manually reject an image from a candidate set when the candidate set is presented to the user. For example, as described with an embodiment of FIG. 4, the candidate set of images may be displayed to the user, and the user may make a correction or rejection to an image that contains a face that the user knows is mis-recognized, or otherwise not a good basis for use in recognition. As such, it is possible for the user to reject a candidate image.

As an alternative to an embodiment that uses clustering, another embodiment provides that step 310 may be performed, at least in part, by an algorithm that simulates face or object recognition. Such an algorithm may speculate different training sets, and then would programmatically select the training set that returns the maximum recognized faces or objects. In one embodiment, such an algorithm may be determined by the following sub-steps:

(i) Obtaining a distance matrix, such that $d_{ij}$ provides the distance between two faces i and j. This distance can also take the lighting, and pose of the face into account, and can apply additional penalty or weights for tilted pose, and directional lighting. In practice, the matrix can be sparse, and can be obtained using a nearest-neighbor structure. Instead of calculating for every i and j, the distance is calculated only for the closest N faces in the nearest neighbor structure.

(ii) traversing the indexes from 1 to n, where for each index i, the faces that are closer than a distance threshold, T (face recognition acceptance threshold) are obtained. The list of indexes (CLOSELIST) and the distance values are saved.

(iii) obtaining an optimization function over all faces. In one implementation, this function can combine many metrics including: (a) The number of faces that are identified to be closer than distance T in sub-step (ii) (i.e. the size of the CLOSELIST{i} for every face i). (b) an aggregate sum (or the average) of the distances of faces that are closer than distance T; and/or a combination of (a) and (b).

(iv) calculating the optimization function for every face i. A sorted index is obtained by sorting these function values. This sorted list is then traversed while a list of chosen labels and potentially recognized faces are constructed. The chosen labels list is the final list to be shown to the user, while the potentially recognized face list is the list of faces estimated to be recognized given the selection of chosen labels. A pseudo code for this step is provided below.

```
ChosenLabelList = empty list.
PotentiallyRecognizedFaceList = empty list.
For j=1 to n
    If SortedIndex(j) is not already in PotentiallyRecognizedFaceList,
        put SortedIndex(j) in the ChosenLabelList.
        Put SortedIndex(j) in PotentiallyRecognizedFaceList.
        Put all the faces in the CLOSELIST{SortedIndex (j)} into
        PotentiallyRecognizedFaceList.
    end
end
```

The faces under the ChosenLabelList is shown to the user.

As described with one or more embodiments described above, labels may subsequently be obtained from the user.

Object recognition systems and techniques (including general pattern recognition) may be implemented in a supervised or semi-supervised learning environment. Embodiments described herein further provide an adaptive acceptance threshold which controls the number of errors made by the system during a learning process, based on the historic performance on that task, as well as the expected difficulty of the task.

Figure 4:
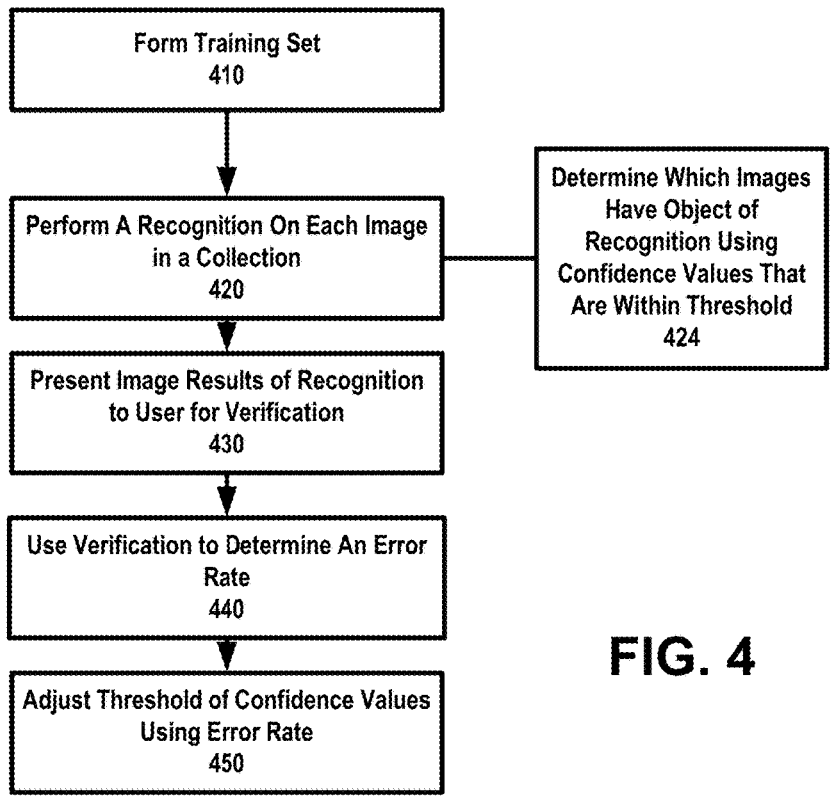
FIG. 4 illustrates a semi-supervised process for dynamically altering an acceptance threshold for object recognition, according to one or more embodiments of the invention.

FIG. 4 illustrates a semi-supervised process for dynamically altering an acceptance threshold for object recognition, according to one or more embodiments of the invention.

In a step 410, a training set is formed. One or more embodiments provide that a training set may be formed using, for example, an embodiment such as described with FIG. 3.

Step 420 provides that recognition is performed for individual images in a collection. The recognition may be for objects and/or faces. The recognition may be performed by comparing objects of interest from images in a collection with corresponding images from the training set. In performing recognition of step 420, a sub-step 424 provides that a programmatic determination is made of individual images in the collection that contain an object of interest, with confidence values that within a designated threshold. The confidence values provide a quantitative measure as to a level of certainty that a recognition was correctly performed. Thus, for example, a program may scan and analyze a collection of digital images, and determine recognition for one or more of the images, provided the confidence values of the recognition are within a designated threshold or tolerance level.

In a step 430, image results from performing a recognition process on individual images contained in the collection are presented to the user for verification and feedback. In particular, an embodiment provides that the user may mark individual recognition results as correct or incorrect. Correct and incorrect results may be tabulated or otherwise tracked.

Step 440 provides that an error rate is determined from the user verification.

In step 450, the confidence value threshold for determining recognition of objects in images is adjusted upward or downward, based on the error rate. For example, if the error rate is determined to be high (based on internal standard), the threshold may be lowered to reduce the error rate.

As an alternative or addition to adjusting the threshold, correctly recognized results may be added to the training set, so that the training set is progressively increased in size. Likewise, an error set may be maintained and updated for incorrect results. One or more both of the progressively updated training set and error set may be used to increase the recognition rate.

The following provides an example of how an embodiment such as described with FIG. 4 may be implemented in the context of facial recognition. A user supplies example photographs for use as part of a training set on a computer on which image recognition software is made available. The image recognition software uses the training set to identify objects or faces. When recognition is performed, the software may also produce a confidence score for each object or face. The recognition process generates correct results as well as errors, which are undesirable. An acceptance threshold is applied to the confidence score of each result to determine which results to accept and which to reject. The user is then presented with the accepted recognition results. The user may then provide input in the form of indicating whether individual results are correct or incorrect.

According to one embodiment, correct results may be added to the training set. Incorrect results may be added to a set of error examples. The set of error examples is used in turn along with the training set and potentially additional user supplied examples to run recognition again and increase the number of recognized faces. This process can go on for multiple iterations as long as the user supplies additional information to the recognition software.

According to one or more embodiments, a user verification process is often much more labor intensive when the user is presented with a lot of errors. To maximize user satisfaction, the following parameters may be controlled: (i) the total number of errors #E presented to the user; and (ii) the relative error rate, defined as #E/#R, where #R is the number of results.

At the same time, the total number of correct faces recognized should not be impacted.

Controlling the number of errors and the error rate can be achieved by altering the acceptance threshold: a higher threshold will reduce the number of errors, at the cost of getting fewer recognition results. A lower threshold will cause the system to accept more recognition results, at the risk of letting through more unwanted errors. One or more embodiments (such as described with an embodiment of FIG. 4) provide the threshold to be adaptive based on the expected number of errors made by the system.

Since the number of errors #E made by the system is unknown at the stage where the threshold determination is made, and then only learned subsequently, one or more embodiments uses an estimate of #E to determine the designated threshold on-the-fly. Such a determination may be based on multiple sources of information, including but not limited to:

1. the numbers #R and #E collected so far, that is: the number of recognized objects or faces and the number of errors made during previous iterations of the semi-supervised learning process. This information can be made available to the decision process by examining the size of the training set and the size of the error set.

2. the number #U of faces left to be recognized in the data, which is a clue to the expected #R in the next iteration.

More specifically, the decision threshold T can be written as: $T=T0+f(\#R, \#E, \#U)$, where $T0$ is a default threshold and $f()$ a function which maps the numbers collected from the data to a confidence penalty.

In a more specific instance, the expected error rate can be based on a smoothed estimate of the error rate so far: $\#EE=\#E/(\#R+a)$, 'a' being a constant. The expected number of faces to be recognized can be based on a fraction of the total number of unknown faces: $\#UU=\min(1, \#U/b)$, 'b' being a constant. The function f can then be a function of the two parameters: $f(\#EE,\#UU)$. As an example, f can increase with the proportional number of errors (#EE), but decreases with reduced number of remaining unknown faces (#UU).

Figure 5:
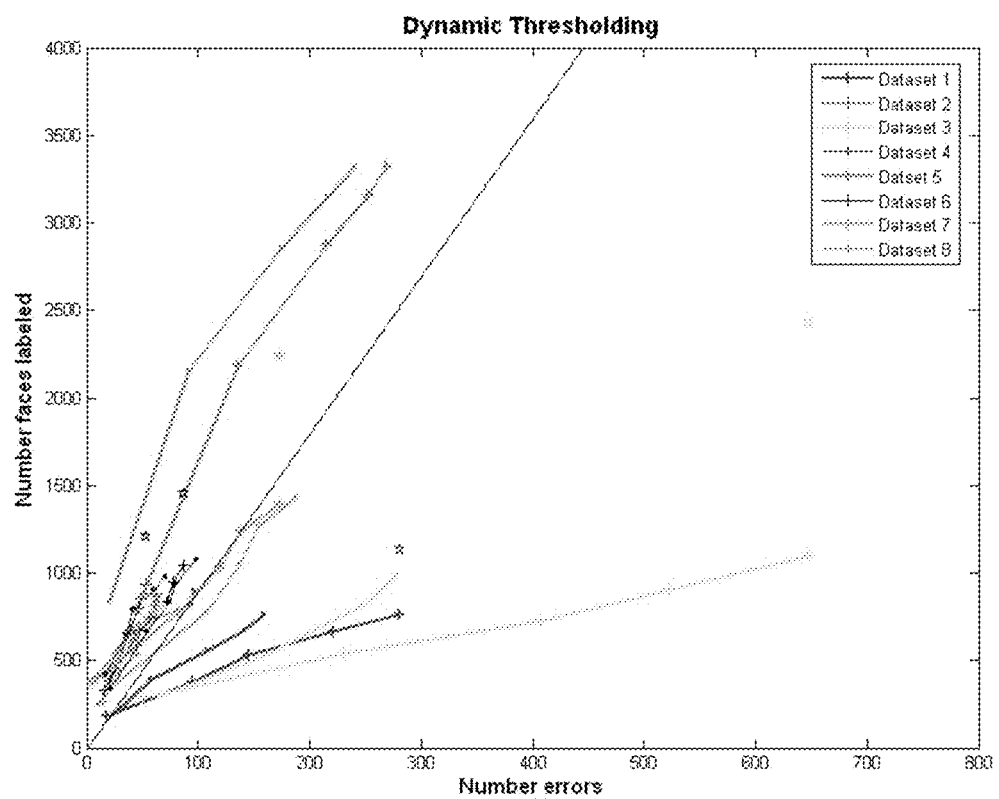
FIG. 5 is a graph showing a performance of one embodiment described herein, on multiple datasets.

A graph of FIG. 5 shows a performance of one embodiment described herein, on multiple datasets. The curves show the number of correct faces recognized (Y axis) against the number of incorrect faces (X axis) after up to five iterations of the semi-supervised learning process.

The curves with '+' markers use a fixed threshold T0, and the curves with '.' markers use the adaptive threshold T described in this invention. The dynamic threshold contributes to achieving various benefits, such as (i) not to reduce the number of correct faces recognized, (ii) to control the number of errors made by the system (X axis), (iii) to control the relative error rate of the system.

In a graph shown, a relative error rate is the slope of the curve. As an illustration, the black diagonal line has a slope corresponding to a 10% relative error rate.

Registration

As mentioned, an image recognition system (such as for faces and objects) can analyze two images and determine if the same subject (or class of object) is present in both. To do this, regions around corresponding points on the object of interest need to be compared. However, finding these corresponding points is a challenging task in digital images (such as consumer photographs), which contain large appearance variability amongst faces or objects due to changes of viewpoint, object deformations (such as expression on a face) and lighting. One or more embodiments provide a registration algorithm, which can find corresponding object features in the presence of such appearance variability, as an integral part of an overall recognition system for use in digital images.

Embodiments described herein include a system for finding corresponding points in objects of interest that appear in, for example, consumer photographs. When applied to face registration, for example, such a process may be referred to as face registration. Given an image of a face, the algorithm determines the precise locations of a set of multiple features in the image, which include but are not limited to the eyes, the tip of the nose, the ends of the mouth, and the locations of the ears, hairline, and eyebrows. Similar processes may be performed with other kinds of objects. For simplicity and illustrative purposes, however, some embodiments described herein may refer to techniques that use face registration, and it is understood that face registration is representative of recognition of other objects.

In another embodiment, the locations of these marker features are used to compute a dense correspondence map of between all pixels in the image and the pixels of a generic face model, represented as a two-dimensional image. In another embodiment, the dense correspondence map can be computed between the image pixels and the vertices of a generic three-dimensional object or face model.

According to an embodiment, an algorithm for object or face registration may be configured to locate a location of multiple marker features in a photograph. As mentioned, a photograph containing a face, for example, may have marker features corresponding to the eyes, mouth, nose etc but also any other parts of the face which may not correspond to a specific anatomic part.

As mentioned with one or more embodiments, an object of interest may correspond to a face or some other object.

Accordingly, one or more embodiments define a probabilistic model in the form of a Markov network, which combines information about local appearance of the features in images, as well as geometric constraints on the relative location of the features. A Markov network associates a location variable $X_i$ with each face feature Fi. The domain of the variable is discrete, corresponding to several distinct location hypotheses for that feature in the image. A feature appearance potentials may be defined as $$\phi(Xi=[x,y]) \quad (1)$$

which estimate the likelihood that feature Fi is located at pixel [x,y] in the image based on the appearance of the image around that location.

In one embodiment, a local feature appearance model may be used. Such a model may be learned from ground truth data, which contains example images of the objects of interest, or faces, where the locations of the features of interest are human-labeled. In one embodiment, a Gaussian appearance model is assumed for the pixel intensities of an image patch centered on a particular feature. A low-dimensional feature space is estimated by using Principal Component Analysis (PCA) and the largest principal components are retained. The local appearance potential $\phi(Xi=[00x,y])$ assigns a high likelihood in cases when (i) The difference between the image patch centered on [00x,y] and its PCA space reconstruction is small, and (ii) The Mahalanobis distance between the mean feature appearance and the image patch projection to PCA space is small.

The overall likelihood is determined as a weighted combination between the above two criteria, where the tradeoff is estimated by cross-validation on the ground-truth data.

In another embodiment, a local feature appearance model can be learnt using classifiers such as boosting (Adaboost) or support vector machines (SVM). In this formulation, the ground truth data for each feature contains a set of positive and negative examples, and the goal is to classify the patch into one containing the feature at its center or not. A trained classifier (Adaboost or SVM) not only classifies a given patch but also provides a certainty score. This certainty score can be used to obtain the values of the local appearance potential $\phi(Xi)$ as follows. A subset of the ground truth data (a holdover set) is left out from the examples provided to the classifier. The learned classifier is applied to this subset of examples and for each certainty score of the classifier the probability that the classifier is correct is estimated. To avoid overfitting, the ratio can be computed for certainty score ranges. Alternatively, a logistic regression model can be used. The resulting probabilities are used as values in the local appearance potential $\phi(Xi)$.

The probabilistic model also enforces constraints on the relative location of the face features. This is done with pairwise potentials $\phi(Xi, Xj)$ although higher-order potentials can be used as well. Such pairwise potentials assign a probability for each possible combination of the locations of Xi and Xj, expressing preferences such as "the right eye is placed to the right of the left eye". They can be introduced between all pairs of features ($O(N^2)$ potentials for N features) or between each feature a few of its nearest neighbor features (complexity O(kN) if k neighbors are used). The values of these features are estimated from data as follows. The oriented vector d=Xj−Xi for each considered pair of features is computed in all labeled training examples, and a Gaussian distribution is learnt over the vectors $d_{ij}$ for each pairwise potential $\phi(Xi, Xj)$.

The feature appearance and relative position in images changes for different orientations of the object of interest. Therefore, one or more embodiments recognize that it may be advantageous to group the ground truth examples by face pose, and learn separate feature appearance and relative feature location models for each of these poses. In another embodiment, when the appearance models are not substantially different, the same appearance model can be used for several features and/or in several poses (for example, the same appearance model can be used for right eye and left eye).

Figure 6:
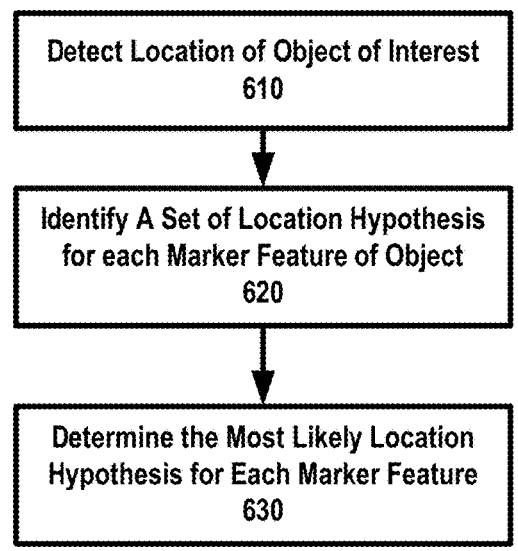
FIG. 6 illustrates a method for determining face or object registration, according to an embodiment of the invention.

FIG. 6 illustrates a method for determining face or object registration, according to an embodiment of the invention. In step 610, an object of interest may be detected. In one embodiment, for example, the registration algorithm may be performed for faces, and such an algorithm may require face detection, as described in, for example, U.S. patent application Ser. No. 11/246,589, filed Oct. 7, 2005, and incorporated by reference herein. The result of face detection is the determination of a face box in which registration is to be performed, as well as the location of any two standard for marker features of the face. These two features are used to scale and rotate the image appropriately before face registration is performed. Recognition of non-facial objects may similarly be performed.

In step 620, a set of location hypotheses for each object feature or marker may be determined. In one implementation, a Markov network may be constructed to contain single and pairwise potentials, $\phi(Xi)$ and $\phi(Xi, Xj)$, as described elsewhere in this application.

Step 630 provides that a most likely hypothesis location is determined from the set for each of the markers or features of the object of interest. In one implementation, for example, a Loopy Belief Propagation may be used to obtain the most likely feature locations that maximize the probability defined by the Markov network. Because different Markov network models have been learned for each different face pose, in principle, an algorithm may be implemented to try all these models and select the model and solution, which provides the highest joint likelihood.

For efficiency, one or more embodiments incorporate a pose classifier to predict likely face or object poses. The registration module then may use Markov network inference only for those poses. The pose classifier can be trained using Adaboost, or can use separate Gaussian face appearance models for each pose, similar to the local feature appearance models described elsewhere in this application.

The feature or marker locations of the face or object of interest, obtained as described with an embodiment of FIG. 6, can be used to compute a dense correspondence map between the face image and a generic two-dimensional face model. Given the locations for the features, a deformable mapping for the remaining pixels of the image can be estimated. An affine mapping or thin-plate spline models, among others, can be used. All images mapped to the same generic model can be easily compared.

In another embodiment, the feature locations can be used to compute a dense correspondence map between the face image and a generic three-dimensional face model. Again, images mapped to the same three-dimensional face model can be easily compared.

Figure 7:
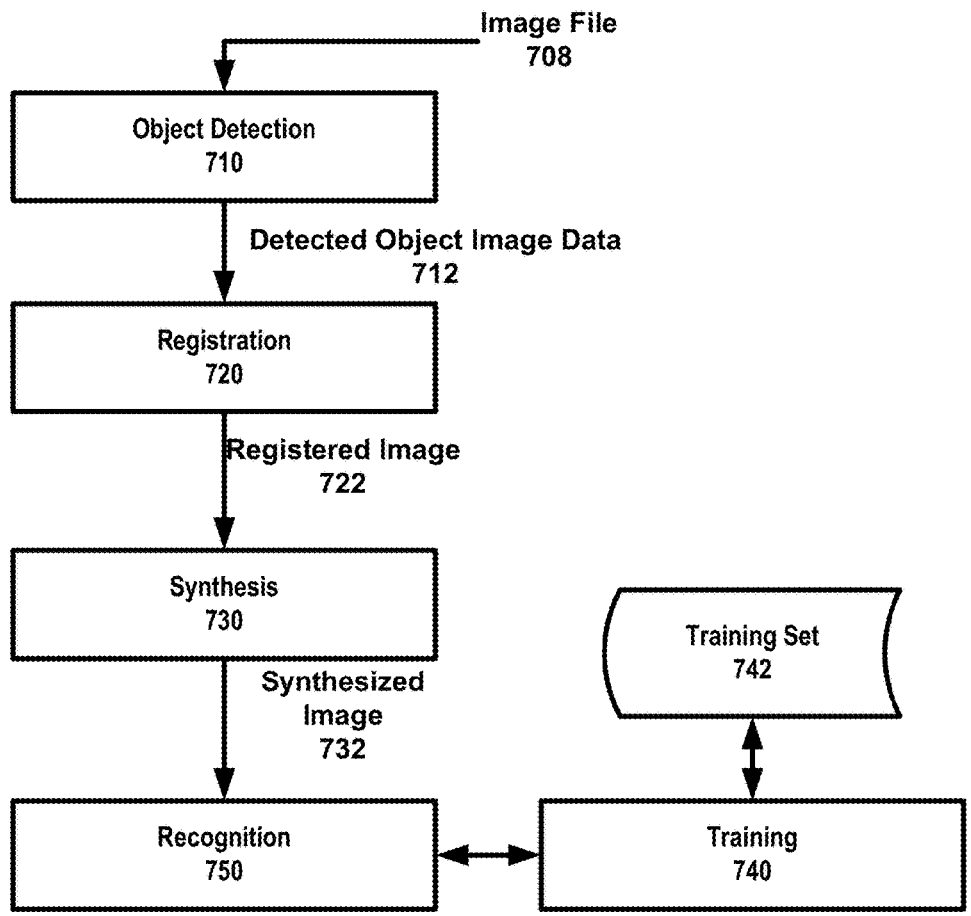
FIG. 7 illustrates an image recognition system constructed according to embodiments described herein.

FIG. 7 illustrates an image recognition system constructed according to embodiments described herein. In embodiment, a system 700 includes object detection module 710, registration module 720, synthesis module 730, training module 740, and recognition module 750. The object detection module 710 may, as described with one or more embodiments provided herein, detect a region of an image where a face or other object of interest is located. An input for the object detection module 710 is an image file 708 or other image source. The output of the object detection module 710 is image data for a region of an image that includes the detected object, The registration module 720 performs a registration process or algorithm on the region of the image where the object of interest is detected, as provided by detected object image data 712. The registration module 720 may implement one or more algorithms for performing registration, including, for example, an algorithm in accordance with an embodiment of FIG. 6. The registration module 720 may provide a registered image output 722, for use by the synthesizer module 730 and/or recognition module 750.

If the object is posed at a tilt that makes complete recognition difficult or impossible, the synthesizer module 730 may be used to generate or synthesize an image, provided by synthesized image data 732. The synthesized image data 732 may accommodate or compensate for presence of occlusion or distortion, as a result of the tilt in the object of interest in the image file 708. As an alternative or addition, the image may be normalized to facilitate the recognition. The synthesizer module 730 may be configured according to, for example, using a system such as described with an embodiment of FIG. 1A, and/or otherwise be configured to implement an algorithm such as described with an embodiment of FIG. 2.

The recognition module 750 may use synthesized (for tilted posed objects) and non-synthesized images (when appropriate or possible) or a combination of the two to perform recognition. A reference or training set 742 may be established for use by the recognition module 750. Training module 740 may be configured, for example, in accordance with an embodiment of FIG. 3 and/or FIG. 4. As such, training module 740 may continuously gather images from a collection or library of images 744 for purpose of refining or increasing the training set 742. The training set 742, and labels associated with individual images, enables recognition module 750 to provide a desired output (e.g. name or other label identification) when the recognition is performed. As a result of implementing the training module 740 such as described by embodiments herein, recognition module 750 may provide better results.

Moreover, as described above, one or more embodiments provide that the training set 742 created by the training module 740 becomes progressively larger based on an error rate, further increasing the recognition module's performance. The use of synthesizer module 730, to provide synthesized image data 732 when necessary, also enhances performance of the system as a whole, as recognition can be carried out to objects with tilts and poses that would otherwise be too severe for regular recognition.

Figure 8:
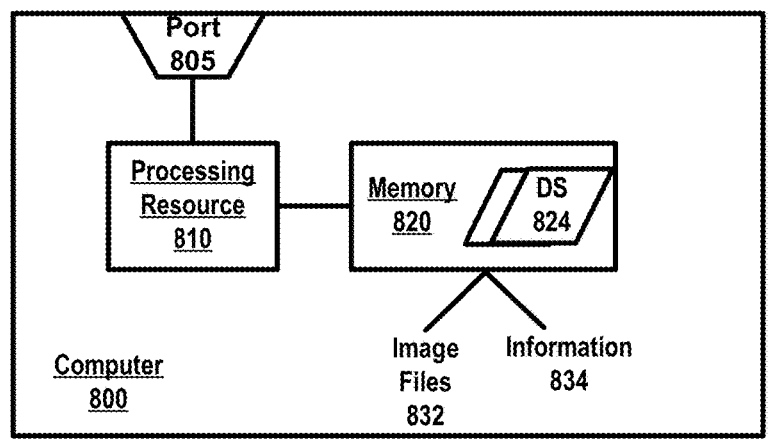
FIG. 8 illustrates a computer system on which embodiments such as described with FIGS. 1-7, and combinations thereof, may be implemented

FIG. 8 illustrates a computer system on which embodiments such as described with FIGS. 1-7, and combinations thereof, may be implemented. A system for implementing one or more embodiments such as described may include a computer 800, such as a desktop computer, work station, or even server. Processing resources 810 may implement the algorithms described herein. A memory resource 820 including data structures 824 may store image files 832 and/or data for identifying locating image files on other computers. The computer 800 may include one or more communication ports 805 for extending communications across a network 802. The memory resource 820 and/or data structures 824 may also store information 834 associated with images that are to be recognized, and information for images that are recognized. Examples of the types of information that may be stored on the computer 800 include image files (and/or information for identifying locations of image files), information identifying training sets, labels associated with image files of the training set, from which recognition occurs, and augmentation information 134 (see FIG. 1). The computer 800 may be operated locally, or from a network. Moreover, some or all of the information determined or stored on the computer 800 may be local or stored on a network. Still further, some information or programs or algorithms may be performed external to the computer 800, and results from those programs or processes may be shared with the computer 800. Additionally, the computer 800 may be part of shared computing environment (through use of the network 802 or otherwise) for performing any one of the algorithms, processes or functions described herein.

In an embodiment, computer 800 may be part of a server system that provides a web service. For example, computer 800 may store image files from users that communicate with the computer using an Internet connection and web browser. In one implementation, computer 800 performs acts of recognition and rendering of results, as well as display of user-interfaces for receiving information such as labeling and responses to programmatic training set determinations.

As mentioned, it is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer implemented method comprising:
identifying an object in an image;
obtaining, from a database of predetermined object models, an object model for the object identified in the image, the object model comprising a plurality of three dimensional points from which a three dimensional surface may be computed;
determining, using the image and the object model, an orientation and one or more occluded features of the object in the image;
augmenting the object model to compensate for the one or more occluded features of the object in the image, wherein augmenting the object model comprises:
augmenting an intensity value associated with at least one of the plurality of three dimensional points; and
rotating the object model; and
providing the augmented object model as output.

2. The method of claim 1, wherein identifying an object in an image comprises:
identifying one or more image markers included in the image, each image marker comprising one or more predetermined image features;
determining that at least some of the one or more image markers match predefined markers of the object model; and
identifying the object in the image as an object represented by the object model.

3. The method of claim 2, wherein determining an orientation of the object in the image comprises:
determining, for each of the one or more image markers, a relationship between the image marker and a matching predefined marker matched by the image marker; and
using each relationship to determine the orientation of the object in the image.

4. The method of claim 1, wherein augmenting an intensity value associated with at least one of the plurality of three dimensional points comprises:
using one or more intensity values of points in the image to augment intensity values of respective three dimensional points.

5. The method of claim 1, further comprising:
prior to augmenting the object model, orienting the object model to pose the object model at an orientation that matches the orientation of the object in the image.

6. The method of claim 1, wherein rotating the object model comprises rotating the object model to a predefined orientation.

7. The method of claim 1, wherein providing the augmented object model as output comprises providing the augmented object model as output to an object recognition system.

8. A system comprising:
one or more data processing apparatus; and
a data storage device storing instructions that, when executed by the one or more data processing apparatus, cause the one or more data processing apparatus to perform operations comprising:
identifying an object in an image;
obtaining, from a database of predetermined object models, an object model for the object identified in the image, the object model comprising a plurality of three dimensional points from which a three dimensional surface may be computed;
determining, using the image and the object model, an orientation and one or more occluded features of the object in the image;
augmenting the object model to compensate for the one or more occluded features of the object in the image, wherein augmenting the object model comprises:
augmenting an intensity value associated with at least one of the plurality of three dimensional points; and
rotating the object model; and
providing the augmented object model as output.

9. The system of claim 8, wherein identifying an object in an image comprises:
identifying one or more image markers included in the image, each image marker comprising one or more predetermined image features;
determining that at least some of the one or more image markers match predefined markers of the object model; and
identifying the object in the image as an object represented by the object model.

10. The system of claim 9, wherein determining an orientation of the object in the image comprises:
determining, for each of the one or more image markers, a relationship between the image marker and a matching predefined marker matched by the image marker; and
using each relationship to determine the orientation of the object in the image.

11. The system of claim 8, wherein augmenting an intensity value associated with at least one of the plurality of three dimensional points comprises:
using one or more intensity values of points in the image to augment intensity values of respective three dimensional points.

12. The system of claim 8, wherein the operations further comprise:
prior to augmenting the object model, orienting the object model to pose the object model at an orientation that matches the orientation of the object in the image.

13. The system of claim 8, wherein rotating the object model comprises rotating the object model to a predefined orientation.

14. The system of claim 8, wherein providing the augmented object model as output comprises providing the augmented object model as output to an object recognition system.

15. A non-transitory computer readable medium storing instructions that, when executed by one or more data processing apparatus, cause the one or more data processing apparatus to perform operations comprising:
identifying an object in an image;
obtaining, from a database of predetermined object models, an object model for the object identified in the image, the object model comprising a plurality of three dimensional points from which a three dimensional surface may be computed;
determining, using the image and the object model, an orientation and one or more occluded features of the object in the image;

augmenting the object model to compensate for the one or more occluded features of the object in the image, wherein augmenting the object model comprises:
augmenting an intensity value associated with at least one of the plurality of three dimensional points; and
rotating the object model; and
providing the augmented object model as output.

16. The non-transitory computer readable medium of claim 15, wherein identifying an object in an image comprises:
identifying one or more image markers included in the image, each image marker comprising one or more predetermined image features;
determining that at least some of the one or more image markers match predefined markers of the object model; and
identifying the object in the image as an object represented by the object model.

17. The non-transitory computer readable medium of claim 16, wherein determining an orientation of the object in the image comprises:
determining, for each of the one or more image markers, a relationship between the image marker and a matching predefined marker matched by the image marker; and
using each relationship to determine the orientation of the object in the image.

18. The non-transitory computer readable medium of claim 15, wherein augmenting an intensity value associated with at least one of the plurality of three dimensional points comprises:
using one or more intensity values of points in the image to augment intensity values of respective three dimensional points.

19. The non-transitory computer readable medium of claim 15, wherein the operations further comprise:
prior to augmenting the object model, orienting the object model to pose the object model at an orientation that matches the orientation of the object in the image.

20. The method of claim 1, wherein determining the one or more occluded features of the object in the image comprises identifying one or more surface-ray intersections in the image.

* * * * *